(12) United States Patent
Sasaki et al.

(10) Patent No.: US 7,643,739 B2
(45) Date of Patent: Jan. 5, 2010

(54) IMAGE PICK-UP APPARATUS HAVING FUNCTION OF DETECTING SHAKE DIRECTION

(75) Inventors: Masaaki Sasaki, Akishima (JP); Shinichi Matsui, Hamura (JP)

(73) Assignee: Casio Computer Co., Ltd., Tokyo (JP)

( * ) Notice: Subject to any disclaimer, the term of this patent is extended or adjusted under 35 U.S.C. 154(b) by 631 days.

(21) Appl. No.: 11/416,046

(22) Filed: May 2, 2006

(65) Prior Publication Data

US 2006/0256231 A1 Nov. 16, 2006

(30) Foreign Application Priority Data

May 13, 2005 (JP) ............................. 2005-141556

(51) Int. Cl.
*G03B 17/00* (2006.01)

(52) U.S. Cl. .................................... 396/55; 348/208.99

(58) Field of Classification Search ............. 396/52–55; 348/208.1–208.16, 208.99, E5.046; 359/554–557
See application file for complete search history.

(56) References Cited

U.S. PATENT DOCUMENTS 6,957,016 B2 * 10/2005 Sato et al. ..................... 396/54

FOREIGN PATENT DOCUMENTS

| JP | 11-027574 A | 1/1999 |
|---|---|---|
| JP | 11-075105 A | 3/1999 |
| JP | 2001-045359 A | 2/2001 |

OTHER PUBLICATIONS

Koichi et al, Partial English Translation of JP11027574, Jan. 29, 1999.*
Tokyo Shibaura Electric Co., Partial English Translation of JP11075105, Mar. 16, 1999.*
Japanese Office Action dated Mar. 4, 2008, issued in counterpart Japanese Application No. 2005-141556, and English translation thereof.

* cited by examiner

*Primary Examiner*—Bot L LeDynh
(74) *Attorney, Agent, or Firm*—Frishauf, Holtz, Goodman & Chick, P.C.

(57) ABSTRACT

An object is shot continuously at such a high shutter speed that blur is not caused due to camera shake, and plural shot images are combined such that object images in the plural shot images coincide with each other, whereby one sharp image of the object is obtained. A correction direction mark is displayed together with a through image during a shooting operation. The correction direction mark indicates a direction and amount to be corrected by its size, when a location of the object image in each shot image shifts from an initial location in an initial shot image out of a predetermined allowable range. Watching the correction direction mark, a user can correct the shooting range so as to meet with the initial shooting range, whereby the shooting range can be prevented from shifting greatly from the initial shooting range during the shooting operation.

22 Claims, 4 Drawing Sheets

FIG. 3A
FIG. 3B
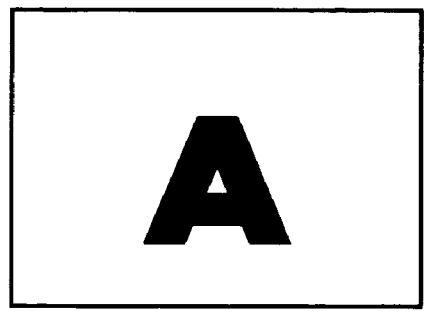
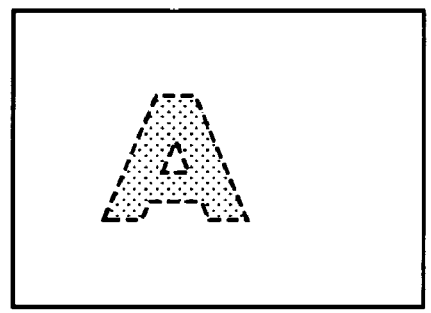
FIG. 3C
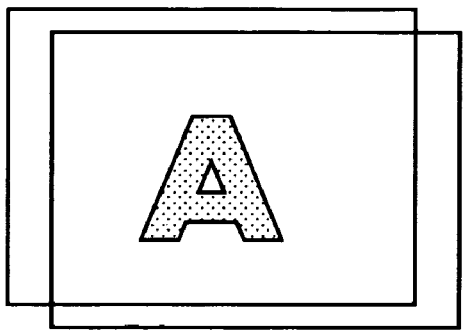
FIG. 3D
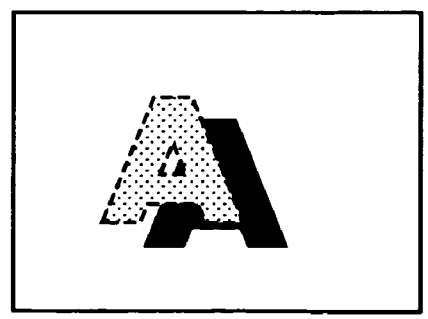

IMAGE PICK-UP APPARATUS HAVING FUNCTION OF DETECTING SHAKE DIRECTION

BACKGROUND OF THE INVENTION

1. Field of the Invention

The present invention relates to an image pick-up apparatus, an image pick-up method, and a program for realizing the apparatus and method, which are appropriately used in a digital camera.

2. Description of the Related Art

When a picture is taken with a camera in a long-exposure mode, the camera body often vibrates due to hand shake, which blurs and deteriorates the photographed image. A method for preventing deterioration of the image has been proposed, in which an object is shot continuously at such a high shutter speed that prevents blurring a photographed image, and plural images of the object obtained by the continuous shooting are combined or composed, whereby one sharp image of the object is obtained, as if the object is shot under an appropriate exposure in a normal long-exposure mode.

But even in the above method, if an object to be photographed should move while plural images of the object are being photographed to be combined into one image, the finally obtained image of the object can blur. To solve this defect, Japanese Laid-open Patent Application No. 2001-45359 discloses a technology, in which when plural images of an object photographed during a certain period are combined, an image-to-image variation of locations of the object in the photographed images is detected, and the positions of the images to be composed or combined are adjusted in unit of pixel based on the detected variation. Using the technology, even if the object locates at different positions respectively in photographed images, blur can be avoided in the finally obtained image.

Even though the positions of the images to be composed or combined are adjusted depending on the image-to-image variation of the object locations respectively in the photographed images, a user of a camera gradually changes a photographing or shooting range unintentionally, while he or she holds the camera to shoot the object in a long exposure mode, which causes the following problems.

That is, when the positions of plural images are adjusted in unit of pixel to be combined and composed into one image, the size of such composed image is limited to a size of a common image area among the plural images obtained by continuous shooting. In case that the size of the image to be combined finally is set to a predetermined size, when images to be combined are moved more than a predetermined amount as a shooting range changes gradually, the common image area among these images reduces less than the predetermined size. As the result, an image which is exposed appropriately over the whole image area cannot be obtained. Therefore, to avoid the above defect, the size of the image to be photographed has to be set to a somewhat small size, in other words, a resolution of the photographed image has to be set low. When the image to be composed finally is set variable in size, another problem occurs that the size of an available photographed image reduces (the resolution of the image decreases) as the shooting range changes greatly.

Further, when an amount which a location of an object image changes within image is detected from plural images obtained by continuous shooting, characterizing points used as a basis for combining the images are set in each image and the images are composed or combined into one image based on the characterizing points. In this case, accuracy in detecting the characterizing points decreases as the shooting range changes greatly, and therefore the images cannot be combined precisely. As the result, a quality of the photographed image decreases. On the contrary, to increase accuracy in detecting the characterizing points, still another problem occurs that complex and time consuming processes are required.

SUMMARY OF THE INVENTION

According to one aspect of the invention, there is provided an image pick-up apparatus having an image pick-up element, which comprises an image pick-up control unit for making the image pick-up element photograph an object plural times continuously to obtain plural images, a detecting unit for detecting a departure amount of an object image in the image obtained last by the image pick-up element from the object image in the image obtained initially by the image pick-up element and a direction of the departure, while the image pick-up unit photographs the object plural times, a combining unit for adjusting the object images in the plural images so as to coincide with each other based on the departure amount and direction of the departure detected by the detecting unit to combine the plural images, whereby one image of the object is obtained, a display unit for displaying the image obtained by the image pick-up unit, and a display control unit for displaying on the display unit a direction of correction opposite to the direction of the departure detected by the detecting unit, when the departure amount detected by the detecting unit exceeds a predetermined value.

According to another aspect of the invention, there is provided an image pick-up method in an image pick-up apparatus, which comprises photographing an object plural times continuously to obtain plural images, detecting a departure amount of an object image in the image obtained last from the object image in the image obtained initially and a direction of the departure during photographing the object plural times, adjusting the object images in the plural images so as to coincide with each other based on the detected departure amount and direction of the departure to combine the plural images, whereby one image of the object is obtained, and displaying a direction of correction opposite to the detected direction of the departure, when the detected departure amount exceeds a predetermined value.

According to still another aspect of the invention, there is provided a computer program for making a computer serve as the following units, the computer being provided in an image pick-up apparatus having an image pick-up element, the above units comprising an image pick-up control unit for making the image pick-up element photograph an object plural times continuously to obtain plural images, a detecting unit for detecting a departure amount of an object image in the image obtained last by the image pick-up element from the object image in the image obtained initially by the image pick-up element and a direction of the departure, while the image pick-up unit photographs the object for plural times, a combining unit for adjusting the object images in the plural images so as to coincide with each other based on the departure amount and direction of the departure detected by the detecting unit to combine the plural images, whereby one image of the object is obtained, a display unit for displaying the image obtained by the image pick-up unit, and a display control unit for displaying on the display unit a direction of correction opposite to the direction of the departure detected by the detecting unit, when the departure amount detected by the detecting unit exceeds a predetermined value.

According to other aspect of the invention, there is provided an image pick-up apparatus having an image pick-up element, which comprises an image pick-up control unit for making the image pick-up element photograph an object plural times continuously to obtain plural images, a detecting unit for detecting a departure amount of an object image in the image obtained last by the image pick-up element from the object image in the image obtained initially by the image pick-up element and a direction of the departure, while the image pick-up unit photographs the object plural times, a combining unit for adjusting the object images in the plural images so as to coincide with each other based on the departure amount and direction of the departure detected by the detecting unit to combine the plural images, whereby one image of the object is obtained, and a combination control unit for, when the departure amount detected by the detecting unit exceeds a threshold value, making the combining unit cease combining the image whose departure exceeds the threshold value with the other image obtained by the image pick-up unit.

According to still other aspect of the invention, there is provided an image pick-up method in an image pick-up apparatus, which comprises photographing an object plural times continuously to obtain plural images, detecting a departure amount of an object image in the image obtained last from the object image in the image obtained initially and a direction of the departure during photographing the object plural times, adjusting the object images in the plural images so as to coincide with each other based on the detected departure amount and direction of the departure to combine the plural images, whereby one image of the object is obtained, and when the departure amount detected by the detecting unit exceeds a threshold value, ceasing combining the image whose departure exceeds the threshold value with the other image.

According to yet another aspect of the invention, there is provided a computer program for making a computer serve as the following units, the computer being provided in an image pick-up apparatus, the units comprising an image pick-up control unit for making the image pick-up element photograph an object plural times continuously to obtain plural images, a detecting unit for detecting a departure amount of an object image in the image obtained last by the image pick-up element from the object image in the image obtained initially by the image pick-up element and a direction of the departure, while the image pick-up unit photographs the object plural times, a combining unit for adjusting the object images in the plural images so as to coincide with each other based on the departure amount and direction of the departure detected by the detecting unit to combine the plural images, whereby one image of the object is obtained, and a combination control unit for, when the departure amount detected by the detecting unit exceeds a threshold value, making the combining unit cease combining the image whose departure exceeds the threshold value with the other image obtained by the image pick-up unit.

BRIEF DESCRIPTION OF THE DRAWINGS

FIG. 3 is a view showing an image combining process.

DETAILED DESCRIPTION OF THE EMBODIMENTS

Figure 1:
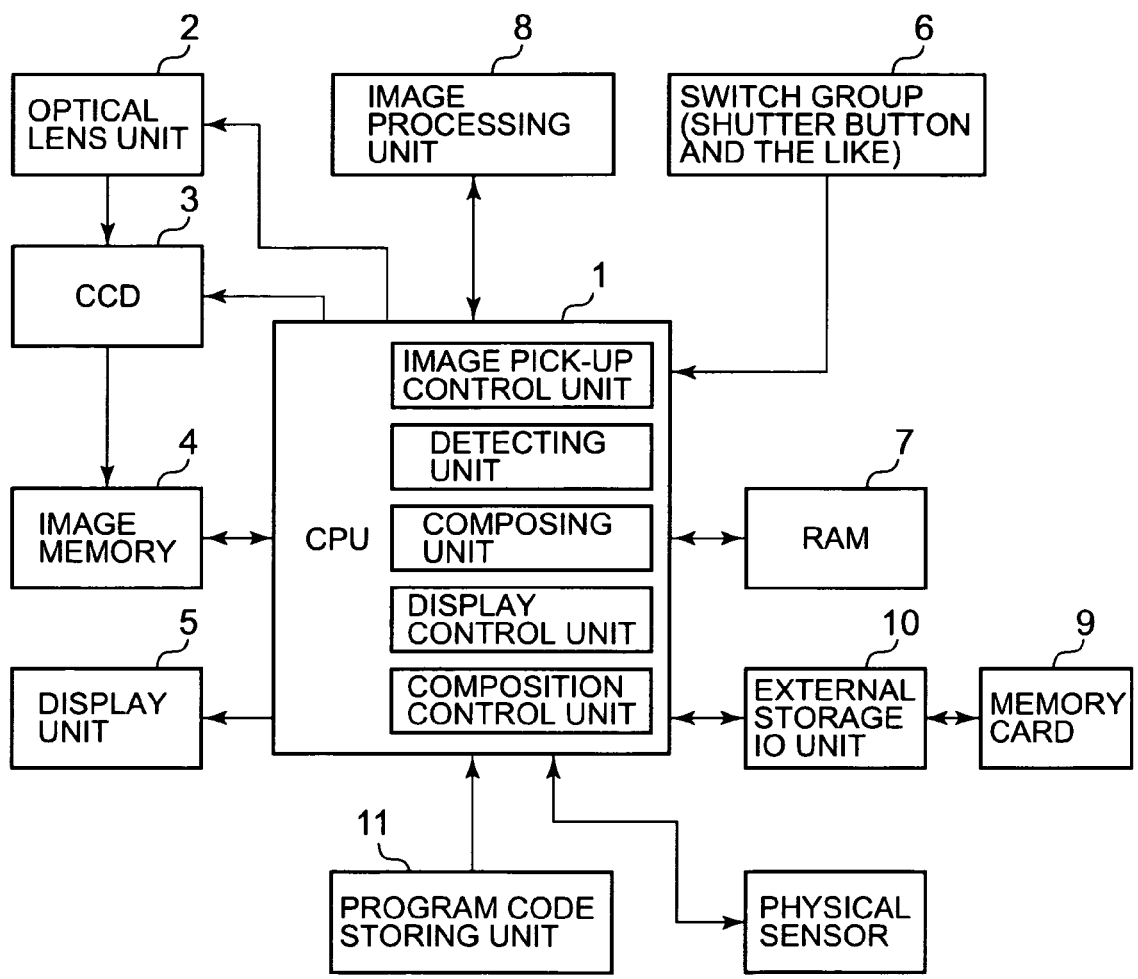
FIG. 1 is a view showing a block diagram of a digital camera according to the present invention.

Now, an embodiment of the present invention will be described with reference to the accompanying drawings. FIG. 1 is a block diagram of a circuit configuration of a digital camera according to the present invention.

The digital camera has CPU 1 at its center for controlling a whole system, to which following units are connected. More specifically, CPU 1 is connected with an optical lens unit 2 including lenses for forming an optical image of an object, CCD 3 for digitizing the optical image formed by the optical lens unit 2 to obtain image data, an image memory 4 for temporarily storing the image data obtained by CCD 3, a display unit 5 including a liquid crystal monitor for displaying the digitized image such as a through image and a reproduced image, and a switch group 6 including a shutter button for generating a trigger, a mode switching button and the like. CPU 1 periodically scans an operated state of the switch group 6. In the present embodiment, the display unit 5 serves as a display unit of the present invention.

Further, CPU 1 is connected with RAM 7 serving as a work memory for recording image data and other data according to need, an image processing unit 8, an external storage IO unit 10 serving as an interface with a memory card 9 for recording compressed image data, and a program code storing unit 11 such as a re-writable nonvolatile memory including EEPROM, a flash memory and the like, for storing programs to be executed by CPU 1. The image processing unit 8 executes various image processing operations including processes for converting image data obtained and temporarily stored in the image memory 4 into YUV data (data in YUV format), for compressing YUV data, and for expanding the compressed image data.

In the program code storing unit 11 are stored various programs to be executed by CPU 1 to control operation of the whole system and an automatic exposure operation (AE control). In particular, a program is stored in the program code storing unit 11, and used for CPU 1 to operate as an image pick-up unit, detecting unit, composing unit, and composition control unit during a shooting operation in a long-exposure mode.

Figure 2:
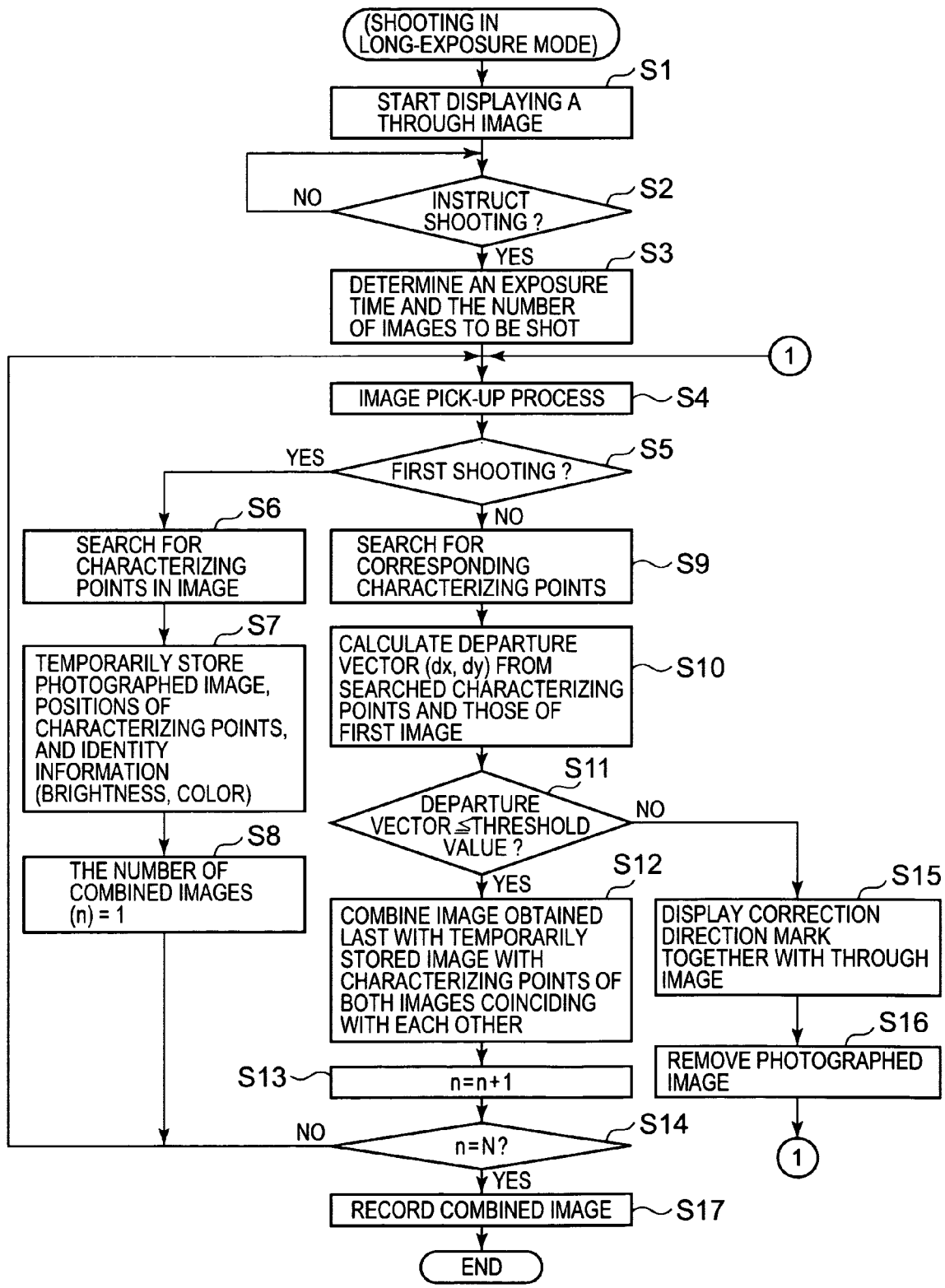
FIG. 2 is a flow chart of operation of the digital camera in a long-exposure mode.

Now, operation of the digital camera of the present invention, having the above configuration will be described in detail. FIG. 2 is a flow chart showing a shooting operation of the digital camera in the long-exposure mode, which is a sub-mode in a recording mode of the digital camera. The long-exposure mode is a mode for continuously photographing or shooting a still image of an object. More specifically, the long-exposure mode is a photographing mode prepared for photographing or shooting the object in a dark place. For example, when an object is shot in a dark place at a shutter speed determined under the AE control and the photographed image of the object can blur due to a camera shake. The long-exposure mode is prepared for the purpose of using in this state to obtain a sharp image of the object.

As shown in the flow chart of FIG. 2, when the long-exposure mode has been set, the digital camera starts its operation immediately to obtain an image of the object at a certain through rate of CCD 3, and displays a through image of the object on the display unit 5 at step S1. Upon display of the through image, AE control operation starts. When the shutter button is pressed to instruct shooting the object (YES at step S2), an exposure time is determined based on the object brightness measured under the AE control operation directly before the shutter button is pressed, and the number (N) of images to be photographed is determined based on the exposure time. Setting data relating to the exposure time and the number (N) of images is store on a certain area of RAM 7 at step S3.

An image pick-up process is executed at a shutter speed previously set to such an extent that the photographed image does not blur, obtaining an image of the object at step S4. Since the image pick-up process is executed for the first time (YES at step S5), plural pixels which are greatly different in brightness and/or color from other pixels in the obtained image are detected as characterizing points at step S6. The image, position coordinates of the plural characterizing points detected in the image, and identity information (brightness, color) for identifying the characterizing points are stored on RAM 7 at step S7. The number (n) of the combined images is set to "1" at step S8, and the operation returns to step S4, where the following image pick-up process is executed. The image pick-up process is executed every predetermined interval between the image pick-up processes.

After the image pick-up process has been executed for the second time (NO at step S5) to obtain a new image (second image), characterizing points corresponding to those of the image (first image) stored on RAM 7 are searched for through the newly obtained image (second image) at step S9 based on the identity information which has been stored previously on RAM 7 at step S7. A departure vector (dx, dy), which consists of an element indicating a departure amount of an object image in the second image from the object image in the first image and an element indicating a direction of the departure is calculated using position coordinates of the searched characterizing points (characterizing points of the second image) and the characterizing points of the first image stored on RAM 7.

When it is determined at step S11 that the calculated departure vector (dx, dy) is equal to a predetermined threshold value or less (YES at step S11), the image newly obtained (second image) at step S4 is moved such that the characterizing points of the image (second image) coincide with those of the image (first image) temporarily stored on RAM 7 and then the second image is combined with the first image at step S12. FIGS. 3A to 3D are views showing the process for combining or composing the two images. FIGS. 3A, 3B and 3C are views showing the first image, second image and combined or composed image, respectively. FIG. 3D is a view exemplarily showing the second image combined with the first image with the position of the second image not adjusted such that the characterizing points of the both images coincide with each other. After the above image combining process has been executed, the number (n) of the combined images t is incremented by "1" at step S13. The operation returns to step S4, and the image pick-up process is repeatedly executed to obtain a third, forth, fifth images and so on and the processes at steps S9 through S14 are repeatedly executed on the obtained images until the number (n) of the combined images reaches the previously set number (N) of the images.

Figure 4:
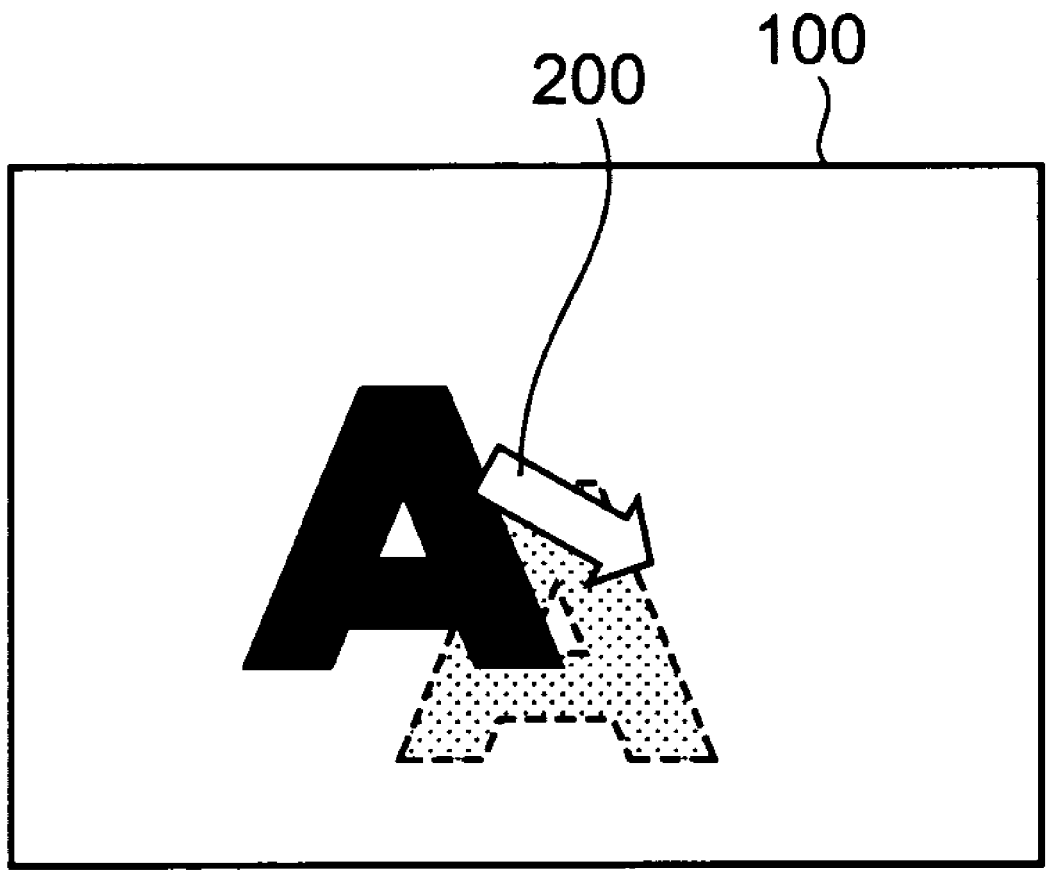
FIG. 4 is a view illustrating a correction direction mark displayed together with a through image.

Meanwhile, when the calculated departure vector (dx, dy) of either of the obtained images exceeds the threshold value (NO at step S11), a correction direction mark 200 indicating a direction of correction opposite to a direction of departure between the two images and having a size (or length) representing such departure amount is displayed on a through image 100 displayed on the display unit 5 in an overlapping manner as shown in FIG. 4 at step S15. The user of the digital camera can confirm by the correction direction mark 200 how much the image photographed last has been shifted from the combined image of the previously photographed images and learn the direction of correction and the correction amount of the image to be photographed. It may be also effective to display the correction direction mark 200 only for a predetermined period, for example, for 5 seconds (not shown in the flow chart of FIG. 2). When the user corrects the blur of the image reviewing the correction direction mark 200, the image can be corrected excessively. In this case, it is preferable to display a separate correction direction mark in place of the correction direction mark 200 being displayed on the display unit 5, or an overlapping manner. Further, it will be preferable to display the correction direction mark 200 until the blur of the image has been corrected actually. For descriptive purposes, the object image (black character "A") photographed last at step S4 and the object image of the combined image are displayed in FIG. 4, but actually the latter object image of the combined image is not displayed together with the through image 100. After the through image 100 and the correction direction mark 200 have been displayed, the image obtained last at step S4 is removed at step S16, that is, the last obtained image is not used to be combined to generate the combined image. Then, the operation returns to step S4 and processes at steps S9 through S14 are repeatedly executed.

When it is determined at step S14 that the number (n) of the combined images has reached the number (N) of images to be photographed previously set at step S3 (YES at step S14), the combined image of plural images stored on RAM 7 is compressed in the image processing unit 8, and the compressed image is recorded on the memory card 9, finishing the first shooting operation.

As described above, in the shooting operation in the long-exposure mode, the object is photographed several times continuously at a fast shutter speed, and plural photographed images of the object are successively adjusted their positions to be put on and combined with the other images previously photographed, whereby even if the user takes pictures of the object at a typical slow shutter speed holding the camera with his/her hands without using a tripod or camera support, a sharp-focus image of a properly-exposed object can be obtained, which is not degraded due to blur.

During the shooting operation, for example, when the user changes a shooting range unconsciously, bringing an object image appearing within the image out of a previously assumed allowable range (when the blur vector exceeds the threshold value), the user can learn by the correction direction mark 200 displayed together with the through image 100, a direction in and an amount by which the shooting range should be corrected. Then, the user can correct or shift the shooting range so as to meet with the initial shooting range in accordance with the indication of the correction direction mark 200, and decrease to the minimum the departure of the shooting range from the initial shooting range during the shooting operation.

Meanwhile, when the object image appearing in the image shifts out of the previously assumed allowable range, that is, when the object image shifts greatly and reliability of the characterizing points detected within the image is low, then such image is not used to be combined with the other images. Therefore, without executing a complex image process for increasing accuracy in detecting the characterizing points in the image, a photographed image of a high image quality, which is represented by a combination of images precisely adjusted in position, can be obtained without failure. In addition, as described above, since the possibility of the shooting range being greatly shifted during the shooting operation can be reduced, the number of times of shooting operation to be executed for ensuring appropriate exposure can be reduced, that is, the shooting operation requires a shorter time.

In the embodiment, the correction direction mark 200 is displayed when departure of the object image of the image exceeds the previously assumed allowable range, but modification may be made to the embodiment such that the correction direction mark 200 is displayed when the departure of the object image has reached a predetermined departure before exceeding the previously assumed allowable range. In this case, the possibility can be substantially reduced of the shooting range being greatly shifted during the shooting operation to make the object image exceed the previously assumed allowable range, whereby the shooting operation does not require a longer time.

Meanwhile, when departure of the object image exceeds the previously assumed allowable range within the image, the image may be removed without being used to be combined with the other images at step S16. Using the correction direction mark 200 which is displayed when the departure of the object image has reached a predetermined departure before exceeding the previously assumed allowable range, a photographed image of a high image quality, which is represented by a combination of images precisely adjusted in position can be obtained, without executing a complex image process for enhancing accuracy of detecting the characterizing points in the image.

When a size of the final photographed image to be obtained is fixed to a predetermined size, a high resolution image of an object appropriately exposed to light can be obtained without reducing the size of the image less than required. In an arrangement in which the photographed image to be obtained finally is successively variable in size, an image of a higher resolution can be obtained.

Further, a modification may be made to the above embodiment such that two threshold values are prepared, and a first threshold value (above mentioned departure) is used to determine whether the correction direction mark 200 is to be displayed or not, and a second threshold value is used to determine whether or not an image is to be removed without being used to be combined with the other images, and when the departure of the shooting range is between the values corresponding respectively to the first and second threshold values, only the correction direction mark 200 is displayed, and when the departure of the shooting range exceeds the value corresponding to the second threshold value, the correction direction 200 is displayed and the image to be combined is deleted. In the modification, the shooting range can rapidly be corrected so as to meet with the initial shooting range, and therefore a time required for photographing operation can be reduced.

In the embodiment described above, the correction direction mark 200 displayed together with a through image indicates a direction in which the object image is to be moved to correct its location, which direction is opposite to the direction in which the object image shifts its position within the image, and indicates an amount by which the object image shifts. Meanwhile, a correction direction mark may be used which indicates only the direction in which the object image is moved to correct its position. But the correction direction mark indicating both the direction in which the object image is moved to correct its location and the amount to be corrected may be more useful in correcting the shooting range so as to meet with the initial shooting range more precisely. In case that the amount by which the object image is moved to correct its location within the image is indicated by the correction direction mark, a modification may be made such that the amount by which the object image may be moved to correct its location is indicated by its length but not by the size of the correction direction mark. Further, in the embodiment, the correction direction mark 200 is represented by an outline arrow and displayed at the center of the through image 100 as shown in FIG. 4, but may appropriately changed to be represented in other manner and displayed at other position.

As described in the embodiment of the present invention, the variation of locations of the object image within the image is detected from plural images obtained by continuous shooting, and the position of the images to be combined within the image is adjusted based on the detection result (departure vector), but the present invention may be applied to such an arrangement that detects by a physical sensor such as a gyro and acceleration sensor a direction in which a camera body is shook, and/or an amount by which the camera body is shook, and determines the position of the images obtained by continuous shooting to be combined, directly based on the detection result. In the arrangement, when a size of the final photographed image to be obtained is fixed to a predetermined size, a high resolution image of an object appropriately exposed to light can be obtained without reducing the size of the image less than required. In an arrangement in which the photographed image to be obtained finally is successively variable in size, an image of a higher resolution can be obtained.

A case has been described in the embodiment of the image pick-up apparatus for obtaining a high quality image of an object not deteriorated due to a blur (camera shake), in which case an initial image obtained at beginning of shooting operation is used as the first image of the object photographed first in the continuous shooting in the long-exposure mode, but a second image or image obtained thereafter (image photographed during the initial shooting period) may be used, if such image can be used as a standard for plural images obtained thereafter in the continuous shooting.

What is claimed is:

1. An image pick-up apparatus having an image pick-up element comprising:
    an image pick-up control unit for making the image pick-up element photograph an object plural times continuously to obtain plural images;
    a detecting unit for detecting a departure amount of an object image in the image obtained last by the image pick-up element from the object image in the image obtained initially by the image pick-up element and a direction of the departure, while the image pick-up control unit photographs the object plural times;
    a combining unit for adjusting the object images in the plural images so as to coincide with each other based on the departure amount and direction of the departure detected by the detecting unit to combine the plural images, whereby one image of the object is obtained;
    a display unit for displaying the image obtained by the image pick-up control unit; and
    a display control unit for displaying on the display unit a direction of correction opposite to the direction of the departure detected by the detecting unit, when the departure amount detected by the detecting unit exceeds a first predetermined value.

2. The image pick-up apparatus according to claim 1, wherein the display control unit displays on the display unit the direction of correction opposite to the direction of the departure detected by the detecting unit together with the departure amount detected by the detecting unit, when the departure amount detected by the detecting unit exceeds the first predetermined value.

3. The image pick-up apparatus according to claim 2, wherein the display control unit starts displaying on the display unit the direction of correction at the time when the departure amount detected by the detecting unit has exceeded the first predetermined value, and keeps displaying the direction of correction for a predetermined period.

4. The image pick-up apparatus according to claim 1, wherein a size of the image obtained by the combining unit is set to a predetermined size previously.

5. The image pick-up apparatus according to claim 1, wherein the image obtained by the combining unit is variable in size.

6. The image pick-up apparatus according to claim 1, wherein the detecting unit analyzes the plural images obtained by the image pick-up control unit to detect a direction and amount of a shake of a camera body.

7. The image pick-up apparatus according to claim 1, wherein the detecting unit has a physical sensor in a camera body for detecting a direction and amount of a shake of the camera body.

8. An image pick-up method in an image pick-up apparatus comprising:
  photographing an object plural times continuously to obtain plural images;
  detecting a departure amount of an object image in the image obtained last from the object image in the image obtained initially and a direction of the departure during photographing the object plural times;
  adjusting the object images in the plural images so as to coincide with each other based on the detected departure amount and direction of the departure to combine the plural images, whereby one image of the object is obtained; and
  displaying a direction of correction opposite to the detected direction of the departure, when the detected departure amount exceeds a predetermined value.

9. A computer-readable medium having a computer program stored thereon that is executable by a computer provided in an image pick-up apparatus having an image pick-up element and a display unit, the computer program being executable by the computer to make the computer operate as units comprising:
  an image pick-up control unit for making the image pick-up element photograph an object plural times continuously to obtain plural images;
  a detecting unit for detecting a departure amount of an object image in the image obtained last by the image pick-up element from the object image in the image obtained initially by the image pick-up element and a direction of the departure, while the image pick-up control unit photographs the object for plural times;
  a combining unit for adjusting the object images in the plural images so as to coincide with each other based on the departure amount and direction of the departure detected by the detecting unit to combine the plural images, whereby one image of the object is obtained; and
  a display control unit for displaying on the display unit a direction of correction opposite to the direction of the departure detected by the detecting unit, when the departure amount detected by the detecting unit exceeds a predetermined value.

10. An image pick-up apparatus having an image pick-up element comprising:
  an image pick-up control unit for making the image pick-up element photograph an object plural times continuously to obtain plural images;
  a detecting unit for detecting a departure amount of an object image in the image obtained last by the image pick-up element from the object image in the image obtained initially by the image pick-up element and a direction of the departure, while the image pick-up control unit photographs the object plural times;
  a combining unit for adjusting the object images in the plural images so as to coincide with each other based on the departure amount and direction of the departure detected by the detecting unit to combine the plural images, whereby one image of the object is obtained; and
  a combination control unit for, when the departure amount detected by the detecting unit exceeds a threshold value, making the combining unit cease combining the image whose departure exceeds the threshold value with the other image obtained by the image pick-up control unit.

11. The image pick-up apparatus according to claim 10, further comprising:
  a display unit for displaying the image obtained by the image pick-up control unit; and
  a display control unit for displaying on the display unit a direction of correction opposite to the direction of the departure detected by the detecting unit, when the departure amount detected by the detecting unit exceeds a predetermined value.

12. The image pick-up apparatus according to claim 11, wherein the display control unit displays on the display unit the direction of correction opposite to the direction of the departure detected by the detecting unit, when the departure amount detected by the detecting unit exceeds a predetermined value which is smaller than the threshold value, wherein when the departure of the image obtained by the image pick-up control unit exceeds the threshold value, such image is not combined with the other image.

13. The image pick-up apparatus according to claim 11, wherein the display control unit starts displaying on the display unit the direction of correction at the time when the departure amount detected by the detecting unit has exceeded the predetermined value, and keeps displaying the direction of correction for a predetermined period.

14. The image pick-up apparatus according to claim 10, wherein a size of the image obtained by the combining unit is set to a predetermined size previously.

15. The image pick-up apparatus according to claim 10, wherein the image obtained by the combining unit is variable in size.

16. The image pick-up apparatus according to claim 10, wherein the detecting unit analyzes the plural images obtained by the image pick-up control unit to detect a direction and amount of a shake of a camera body.

17. The image pick-up apparatus according to claim 10, wherein the detecting unit has a physical sensor in a camera body for detecting a direction and amount of a shake of the camera body.

18. An image pick-up method in an image pick-up apparatus, comprising:
  photographing an object plural times continuously to obtain plural images;
  detecting a departure amount of an object image in the image obtained last from the object image in the image obtained initially and a direction of the departure during photographing the object plural times;
  adjusting the object images in the plural images so as to coincide with each other based on the detected departure amount and direction of the departure to combine the plural images, whereby one image of the object is obtained; and when the departure amount detected by the detecting unit exceeds a threshold value, ceasing combining the image whose departure exceeds the threshold value with the other image.

19. A computer-readable medium having a computer program stored thereon that is executable by a computer provided in an image pick-up apparatus having an image pick-up element, the computer program being executable by the computer to make the computer operate as units comprising:
   an image pick-up control unit for making the image pick-up element photograph an object plural times continuously to obtain plural images;
   a detecting unit for detecting a departure amount of an object image in the image obtained last by the image pick-up element from the object image in the image obtained initially by the image pick-up element and a direction of the departure, while the image pick-up control unit photographs the object plural times;
   a combining unit for adjusting the object images in the plural images so as to coincide with each other based on the departure amount and direction of the departure detected by the detecting unit to combine the plural images, whereby one image of the object is obtained; and
   a combination control unit for, when the departure amount detected by the detecting unit exceeds a threshold value, making the combining unit cease combining the image whose departure exceeds the threshold value with the other image obtained by the image pick-up control unit.

20. The image pick-up apparatus according to claim 1, further comprising:
   a combination control unit for, when the departure amount detected by the detecting unit exceeds the first predetermined value, making the combining unit cease combining the image whose departure exceeds the first predetermined value with the other image.

21. The image pick-up apparatus according to claim 1, further comprising:
   a combination control unit for, when the departure amount detected by the detecting unit exceeds a second predetermined value which is greater than the first predetermined value, making the combining unit cease combining the image whose departure exceeds the second predetermined value with the other image.

22. The image pick-up apparatus according to claim 10, wherein the combination control unit destroys images whose departure amount detected by the detecting unit exceed the threshold value and combines only images whose departure amount detected by the detecting unit do not exceed the threshold value.

* * * * *